United States Patent [19]
Kobayashi

[11] Patent Number: 6,049,749
[45] Date of Patent: Apr. 11, 2000

[54] LIGHTING DEVICE FOR A VEHICLE

[75] Inventor: Shoji Kobayashi, Shizuoka, Japan

[73] Assignee: Koito Manufacturing Co., Ltd., Tokyo, Japan

[21] Appl. No.: 08/989,415

[22] Filed: Dec. 12, 1997

[30] Foreign Application Priority Data

Dec. 13, 1996 [JP] Japan ..................................... 8-353006

[51] Int. Cl.$^7$ ................................................. G06F 17/00
[52] U.S. Cl. .............................. 701/49; 701/36; 362/466; 362/37; 362/276; 340/469
[58] Field of Search ........................ 701/49, 36; 362/272, 362/276, 466, 494, 540, 541, 544, 465, 524, 37, 40; 340/469, 471, 472

[56] References Cited

U.S. PATENT DOCUMENTS

| | | | |
|---|---|---|---|
| 4,663,696 | 5/1987 | Miyazaki et al. ......................... | 362/80 |
| 4,733,333 | 3/1988 | Shibata et al. ........................... | 362/40 |
| 5,060,120 | 10/1991 | Kobayashi et al. ....................... | 362/61 |
| 5,068,768 | 11/1991 | Kobayashi et al. ....................... | 362/61 |
| 5,237,306 | 8/1993 | Adell ........................................ | 340/469 |
| 5,343,371 | 8/1994 | Kobayashi et al. ....................... | 362/61 |
| 5,379,196 | 1/1995 | Kobayashi et al. ....................... | 362/61 |
| 5,404,278 | 4/1995 | Shibata et al. ........................ | 362/83.3 |
| 5,412,543 | 5/1995 | Kobayashi et al. ....................... | 362/66 |
| 5,426,294 | 6/1995 | Kobayashi et al. ..................... | 250/226 |
| 5,436,807 | 7/1995 | Kobayashi ............................... | 362/41 |
| 5,497,306 | 3/1996 | Pastrick .................................. | 362/494 |
| 5,562,336 | 10/1996 | Gotou ..................................... | 362/466 |
| 5,588,733 | 12/1996 | Gotou ..................................... | 362/37 |
| 5,660,454 | 8/1997 | Mori et al. .............................. | 362/466 |
| 5,879,074 | 3/1999 | Pastrick .................................. | 362/494 |
| 5,931,572 | 8/1999 | Gotoh ..................................... | 362/466 |

FOREIGN PATENT DOCUMENTS

| | | | |
|---|---|---|---|
| 43 27 780 | 3/1994 | Germany ..................... | G08G 1/0968 |
| 196 01 572 | 8/1996 | Germany ......................... | B60Q 1/12 |
| 196 02 622 | 8/1996 | Germany ......................... | B60Q 1/06 |

*Primary Examiner*—Jacques H. Louis-Jacques
*Attorney, Agent, or Firm*—Sughrue, Mion, Zinn, Macpeak & Seas, PLLC

[57] ABSTRACT

A lighting device in which the vehicle advancing direction at which a driver aims is predicted, and the irradiating direction and irradiating range of a lighting device are controlled by comparing the result of the prediction to the information of the profile of a road on which the vehicle is running at present. The lighting device (1) includes a road profile calculating device (2) for finding an advancing direction of the vehicle in the case where the vehicle advances along a road on which the vehicle is running at present, in accordance with the map information including the road profile and the present position information of the vehicle; and a vehicle advancing direction predicting device (3) for predicting an advancing direction of the vehicle intended by a driver, by an operation signal given by the driver or detection information of the vehicle running state. The irradiation controller device (4) compares the direction data of the road profile calculating device (2) with the direction data of the vehicle advancing direction predicting device (3), the irradiation control of the lighting device (5) is conducted by the road profile in accordance with the direction data of the road profile calculating device (2) when a difference between them is in an allowable range, and the irradiation control of the lighting device (5) is conducted by the direction data of the vehicle advancing direction predicting device (3) when the difference between them is out of the allowable range.

10 Claims, 9 Drawing Sheets

(INTERSECTION)

(Y-SHAPED BRANCH)

LIGHTING DEVICE FOR A VEHICLE

BACKGROUND OF THE INVENTION

1. Field of the Invention

The present invention relates to a lighting device for vehicle use which conducts irradiation control of the lighting device in accordance with a road profile, vehicle operation and vehicle running condition.

2. Background

Conventionally, there is known a device by which an irradiating direction of a lighting device for a vehicle is changed in accordance with a steering angle of the vehicle. In this type device, the following problems may be encountered. As long as a steering member such as a steering wheel is not actually operated, the irradiating direction of the lighting device can not be changed. Therefore, it is impossible to adjust the irradiating direction of the lighting device into a direction in which the vehicle is advancing, just prior to a point in time at which the vehicle advances to a curved road.

In order to solve the above problems, there is proposed a device in which the navigation system (route guidance system) is used and the irradiating direction of the lighting device for vehicle use is changed before the advance of the vehicle to a curved road in accordance with the map information including profile data of the road and also in accordance with the positional information of the vehicle on a map provided in the vehicle. However, the above device is disadvantageous in that the irradiation control can not be completely conducted when the vehicle is on a road which is not included in the map information and also when the vehicle advances to a route not scheduled at an intersection. That is, when the navigation system can not be used or the vehicle advancing direction is changed at an intersection, priority is given to the driver's intention.

In order to solve the above problems, there is known a device in which priority is given to the irradiation control of the lighting device for vehicle use based on the operation of a direction indicator and the detection of a steering angle, over the irradiation control based on the map information.

It is possible to conduct irradiation control of the lighting device irrespective of the navigation system in the following manner. For example, a signal sent out from a direction indicator of the vehicle is discriminated, and the irradiating direction of the lighting device is changed in a direction of a track to which the signal is indicated. Alternatively, there is provided a detecting means for detecting a steering angle, and the irradiating direction of the lighting device is changed when a steering angle detected by the detecting means is larger than a predetermined value.

However, when the above method is adopted, the following problems may be encountered. Since priority is always given to the operation of the direction indicator of the vehicle and the result of detection of the steering wheel, when a driver mistakenly emits a signal of the direction indicator in an erroneous direction, the irradiating direction of the lighting device is changed in a direction at which the driver is not aiming. Also, when priority is excessively given to the detection of the detected steering angle, it become impossible to accomplish the primary object of changing the irradiating direction of the lighting device before the vehicle enters a curved road.

SUMMARY OF THE INVENTION

According to the present invention, the vehicle advancing direction at which a driver aims is predicted, and irradiation control of the lighting device is conducted by referring the result of prediction to the information of the profile of a road on which the vehicle is running at present.

In order to solve the above problems, the present invention is directed to a lighting device for vehicle use comprising: an irradiation control means for controlling the irradiation of a lighting device for vehicle use in accordance with a road profile, operation of the vehicle and running condition of the vehicle; a road profile calculating means for finding an advancing direction of the vehicle in the case where the vehicle advances along a road on which the vehicle is running at present, in accordance with the map information including the road profile and the present position information of the vehicle; and a vehicle advancing direction predicting means for predicting an advancing direction of the vehicle intended by a driver, by an operation signal given by the driver or detection information of the vehicle running state, wherein the irradiation control means compares the direction data of the road profile calculating means with the direction data of the vehicle advancing direction predicting means, the irradiation control of the lighting device is conducted by the road profile in accordance with the direction data of the road profile calculating means when a difference between them is in an allowable range, and the irradiation control of the lighting device is conducted by the direction data of the vehicle advancing direction predicting means when the difference between them is outside of the allowable range. According to the present invention, the direction data made by the road profile calculating means is compared with the direction data made by the vehicle advancing direction predicting means. Due to the above comparison, when the vehicle advancing direction at which the driver aims coincides with the profile of a road, irradiation control of the lighting device is conducted in accordance the profile of the road. When the vehicle advancing direction at which the driver aims does not coincide with the profile of the road, it possible to conduct irradiation control of the lighting device in accordance with the vehicle advancing direction at which the driver aims.

DETAILED DESCRIPTION OF THE INVENTION

Figure 1:
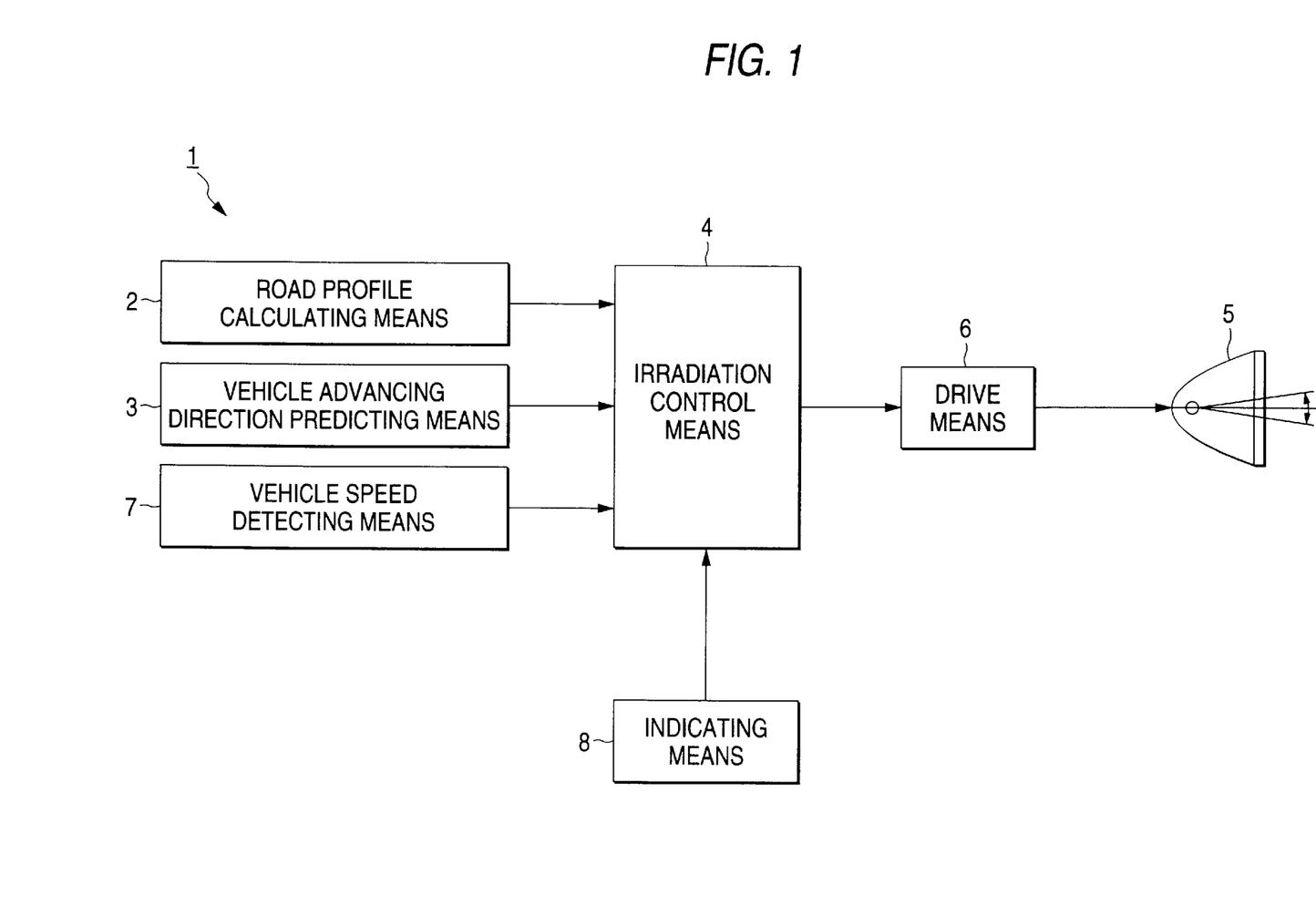
FIG. 1 is a block diagram showing the essential structure of the lighting device for vehicle use according to the present invention.

FIG. 1 is a view showing an essential structure of the lighting device 1 for vehicle use according to the present invention. The lighting device 1 includes: a road profile calculating means 2, vehicle advancing direction predicting means 3, irradiation control means 4 and light device (e.g., headlamp) 5. The irradiating direction and irradiating range of the lighting device 5 are directly controlled by the irradiating control means 4 or indirectly controlled via the drive means 6. In the case of a lighting device used for an automobile, examples of the lighting device 5 are a head lamp, fog lamp and corner lamp.

The road profile calculating means 2 is provided for finding an advancing direction of a vehicle in the case where the vehicle advances along a road on which the vehicle is running at present in accordance with the map information including the road profile and the present position information of the vehicle. An output signal of the road profile calculating means 2 is sent to the irradiation control means 4.

When the road map information is inputted, it is possible to use the navigation system, which is called "Car Navigation System", utilizing electric waves sent from GSP (Global Positioning System) satellite, and it is also possible to use the communication system for conducting communication between the road and vehicle. In the former navigation system, according to the detection signals of the gyrosensor and vehicle speed sensor, the electric wave information sent from GSP satellite received by GSP receiver and the map information recorded on a recording medium such as CD-ROM, it is possible to display the present position of the vehicle on a road map, and it is also possible to guide the vehicle along a scheduled route to the destination. According to the latter communication between the road and vehicle, information about the position of the vehicle and road profile (including a taper and radius of curvature of the road) can be obtained via beacons (poles used for communication between the vehicles and road) which are arranged in central separation zones and road side zones of trunk lines at regular intervals and also arranged at primary corners and intersections in city areas and mountain areas in which many obstacles in correspondence are located.

Further, a system in which the auxiliary channels of FM broadcasting multisystem is used can be adopted to input the road map information. As long as the road profile information and the present position information of the vehicle can be obtained, it is possible to find an advancing direction of the vehicle when the vehicle advances on the road and it is also possible to judge whether or not a branch such as an intersection is located ahead.

The vehicle advancing direction predicting means predicts an advancing direction of the vehicle at which the driver aims, by an operation signal given by the driver of the vehicle or a detecting information of the vehicle running condition. The result of prediction is sent to the irradiation control means 4.

Examples of information used for predicting the vehicle advancing direction are: a direction indicating signal given to the direction indicator, detection signal of the steering angle (steering angle of the steering wheel), vehicle speed detection signal, acceleration detection signal, detection signal of the vehicle posture (output signal of the vehicle height sensor), and scheduled route to the destination that is set in the navigation system having a route guide function. According to the information described above, the vehicle advancing direction predicting means 3 synthetically predicts a vehicle advancing direction at which the driver aims. For example, without relying only on the direction indicating signal, a change in the steering angle is detected every moment from a point in time at which the direction indicating signal is sent out, and it is judged by a change in the vehicle posture, vehicle speed, vehicle acceleration and vehicle running condition whether or not a preliminary behavior to turn in a direction indicated by the direction indicating signal can be recognized, and the vehicle movement can be predicted. That is, when a change in the behavior is detected before the vehicle changes its track, and a direction extrapolated as an extension of the change in the behavior is discriminated as an advancing direction of the vehicle.

An example of the prediction of the vehicle advancing direction is explained as follows using a simplified model. Concerning the direction indicator, a judgment of the right and left is conducted, and also it is detected whether or not there is an indication given by the driver. A direction of the change in the steering angle is discriminated and also an amount of change in the steering angle is discriminated. The direction of acceleration is discriminated and also an intensity of acceleration is discriminated. First, when a direction indicating signal is given, it is temporarily predicted that the advancing direction is to be changed in the direction concerned. When the change in the steering angle in a predetermined period of time is large or the vehicle speed is reduced exceeding a predetermined range, it is judged that the prediction is correct. When the change in the steering angle in a predetermined period of time is small or the vehicle speed is not reduced, the above prediction is corrected, and it is judged that the driver has no intention of changing the track. In the case where the change in the steering angle in a predetermined period of time is large or the vehicle speed is suddenly reduced although there is no direction indicating signal, it is judged that the driver has an intention of changing the tack. In this connection, concerning the importance of the basic information used for prediction, it is not necessary that all pieces of information must be uniform. Of course, in accordance with the value of information, it can be weighted.

When the vehicle advancing direction is predicted, it is possible to utilize information obtained from the above road profile data. For example, in the case of a road on which a branch is located ahead, a distance from the present vehicle position to the branch is calculated, and a change of the steering angle is detected as the distance is shortened. When the change of the steering angle is small, it can be predicted that the vehicle advances straight. When the change of the steering angle is large, it can be predicted that the driver has an intention of changing the track in the changing direction of the steering angle.

When it is predicted that the vehicle advancing direction is the same as the direction of the road on which the vehicle is running at present, the irradiation control means 4 conducts irradiation control of the lighting device in accordance with the road profile. When it is discriminated that the predicted vehicle advancing direction is different from the direction of the road on which the vehicle is running at present, irradiation control of the lighting device 5 is conducted in accordance with the predicted vehicle advancing direction. That is, the irradiation control means 4 compares the direction data of the road profile calculating means 2 with the direction data of the vehicle advancing direction predicting means 3. When a difference between them is in an allowable range, irradiation control of the lighting device 5 is conducted in accordance with the road profile based on the direction data of the road profile calculating means 2. When a difference between them is out of an allowable range, irradiation control of the lighting device 5 is conducted in accordance with the predicted vehicle advancing direction based on the direction data of the vehicle advancing direction predicting means 3.

Concerning the comparison of direction data, for example, it is possible to use a method in which a difference of the angle between two directions is compared with a reference value of judgment. Also, it is possible to use a method in which a predetermined angle width is set for two angles and crossing of the two angles is compared with a reference value of judgment. Concerning the reference value and the angle width used in this case, they may be constant values, or alternatively they may be changed in accordance with other factors such as a vehicle speed.

When it is discriminated that there is a branch ahead on a road, it is preferable to discriminate whether the driver wants to select one of the plurality of selections at the branch or to advance to a track not included in the selections at the branch.

Figure 2:
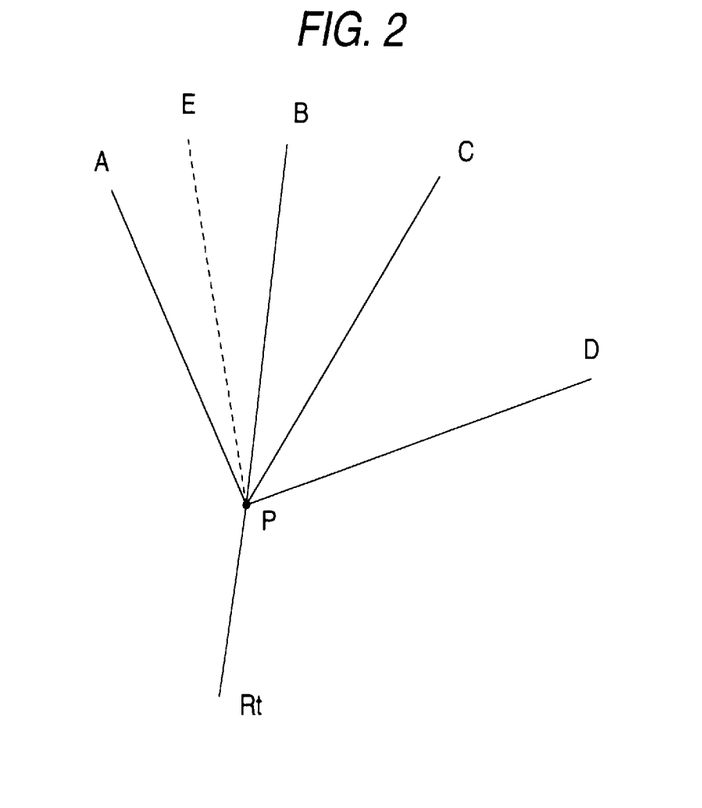
FIG. 2 is a schematic illustration showing the selection of a tack at a branch on a road.

For example, it is possible to consider a case shown in FIG. 2. In this case, branch P is located ahead on road Rt. At branch P, the road branches into roads A to D, wherein roads A to D shown by solid lines are roads included in the map information, and road E (shown by a broken line) is a road not included in the map information. When the driver selects one of roads A to D at branch P, the road profile calculating means 2 sends four groups of data indicating the predicted vehicle advancing directions to the irradiation control means 4, and these groups of data are compared with the direction data sent from the vehicle advancing direction predicting means 3. By this comparison, it is possible to select one of the tracks at branch P, because the driver may select a group of data, which is closest to the direction data sent from the vehicle advancing direction predicting means 3, from the four data groups sent from the road profile calculating means 2. However, in the case where the driver selects road E not included in the map information, the four groups of direction data sent from the road profile calculating means 2 are not close to the direction data sent from the vehicle advancing direction predicting means 3. Accordingly, the irradiation control means 4 conducts irradiation control of the lighting device 5 in accordance with the direction data sent from the vehicle advancing direction predicting means 3 in this case.

When the branch is discriminated, it is possible to make judgment indiscriminately, however, it is preferable to make judgment whether or not it can be assumed to be a branch, in accordance with the scale of the branch. The branch may be discriminated as follows. For example, the following setting may be adopted. Only an intersection provided with a signal machine is discriminated to be a branch, or alternatively according to the grade of a road and the circumstances of an intersection, only an intersection at which trunk roads such as national highways and state highways cross each other is discriminated to be a branch. When the branch is discriminated as described above, the driver may determine its setting by manual operation while a plurality of levels are set. Alternatively, discrimination may be automatically conducted by the vehicle in such a manner that only a large scale intersection is discriminated to be a branch, for example, when the vehicle is running on a passing lane.

Concerning the irradiation control, the following control factors are provided:

(A) Irradiating direction
(B) Irradiating range
(C) Time to start control
(D) Control speed First, concerning the control of the irradiating direction, the following two methods are provided:

(A-I) Method of directing all of irradiation light in a predetermined direction; and
(A-II) Method of directing a portion of irradiation light in a predetermined direction.

The simplest method in the above item (A-I) is to direct an irradiation axis of the lighting device in a predetermined direction by rotating the entire lighting device about its axis. Another method is to direct an irradiation axis of the lighting device in a predetermined direction by controlling the posture of a member composing the lighting device such as a reflecting mirror, lens, light source and shielding member.

According to the method described in item (A-II), irradiation light is changed partially. Accordingly, it is possible to adopt a method in which the irradiation axis of only a specific lighting device is changed in the device composed of a plurality of lighting devices. For example, in an automobile provided with head lamps, fog lamps and corner lamps, the posture of the irradiation axis of one of the lighting devices or the postures of the irradiation axes of two of the lighting devices are controlled. Alternatively, it is possible to adopt a method of controlling the posture of one of the members composing the lighting device or the postures of a plurality of members composing the lighting device. For example, the reflecting mirror is composed of a stationary reflecting mirror and a movable reflecting mirror, and the optical axis of the movable reflecting mirror is directed to a predetermined direction.

Concerning the irradiating range control described in the above item (B), the following two methods are provided:

(B-1) Method in which the irradiating ranges of a plurality of lighting devices are combined with each other; and
(B-2) Method of changing an irradiating range by moving a portion of the components of the lighting device.

First, the method described in item (B-1) is a method of controlling the irradiation range of a portion of lighting devices in which the overall irradiation range is formed by combining the irradiation ranges of a plurality of lighting devices. For example, there are provided two lighting devices, the irradiation ranges of which are different from each other, in a vehicle. The irradiation range of one of the lighting devices is fixed, and the irradiation range of the other lighting device is changed, for example, the irradiation range is extended in the transverse direction.

According to the above method, when some of the plurality of lighting devices, the irradiation ranges of which are different from each other, are selected, it is possible to obtain a desired irradiating range. However, it is necessary to use a large-scale device in the above method. For this reason, when it is necessary to simplify the structure of the device, the method of item (B-2) is preferably used.

That is, when one of the members composing the lighting device or some members composing the lighting device are changed in the posture, it is possible to change the irradiating range of the lighting device. For example, as a method of utilizing the movements of lenses, two lenses are arranged so that the relative positional relation of the two lenses can adjusted, and diffusion of irradiating light is freely controlled when the lens drive is controlled. Also, it is possible to adopt a method in which the irradiating range of the lighting device is changed when a shade provided for shading a portion of light emitted from a light source is moved. Also, the following various methods may be adopted. Only the light source is moved, the reflecting mirror and light source are moved, the lens and reflecting mirror are moved, or the lens and shade are moved together so that the irradiating range can be changed. It is possible to adopt various embodiments in accordance with the combination of the optical composing members of the lighting device.

In this connection, concerning the control of extending and reducing the irradiating range, it is preferable to change the irradiating range in accordance with the speed and acceleration of the vehicle. The reason is that the range of vision of a driver is different between the case of high speed driving and the case of low speed driving, and also the range of vision of a driver is different between the case of constant speed driving and the case of reduced speed driving. It is preferable that the irradiating range is extended in the cases of low speed driving and sharply reduced speed driving as compared with other cases.

Concerning the start time of control described in item (C), for example, in the case of a road having a branch, it is judged whether or not a distance from the branch to the vehicle or a time obtained when the distance is divided by a vehicle speed is in a predetermined range. It is possible to determine a point in time to start irradiation control such as a change of the irradiating direction ox irradiating range in accordance with the result of judgment. In this case, it is preferable that the reference value be changed in accordance with the vehicle speed and/or acceleration, because the way of access to a branch is different according to the vehicle speed. For example, when the vehicle speed is high, the irradiating range of the vehicle is changed at a position distant from the branch, or alternatively the irradiating range is changed early when the track of the vehicle is changed. The higher the acceleration in the negative direction is, the earlier the changing time of the irradiating range is made.

In this connection, concerning the detection of the vehicle speed, a detection signal obtained by the vehicle speed detecting means 7 may be sent to the irradiating means 4 as shown in FIG. 1. Concerning the detection of the vehicle acceleration, it is possible to adopt a method in which an acceleration sensor is provided, and also it is possible to adopt a method in which the vehicle speed detected by the vehicle speed detecting means 7 is differentiated by the time.

Control speed described in item (D) is a changing speed in the case of controlling the irradiating direction and irradiating range. It is preferable that the control speed be changed in accordance with the vehicle speed and/or vehicle acceleration. The reason is that there is a possibility that the irradiating control can not follow a change in the vehicle speed when the control speed is maintained constant. In this connection, concerning the control of a controlling speed, for example, it is possible to adopt a method in which the responding speed of the drive means 6 is changed. There are various types of specific controlling methods. For example, the speed of posture control of the entire lighting device or the members composing the lighting device can be changed by changing a voltage and electric current supplied to the actuator composing the drive means 6 and also by changing a pulse width of the control signal and a duty cycle.

The irradiating control means 4 conducts controlling for the above items (A) to (D). Basic information used for control include:

(a) Information about whether or not there is a branch on a road, and distance or time to the branch;
(b) Operation signal give by a driver, and detection information of the vehicle running condition; and
(c) Information about whether or not road profile data is provided.

Figure 3:
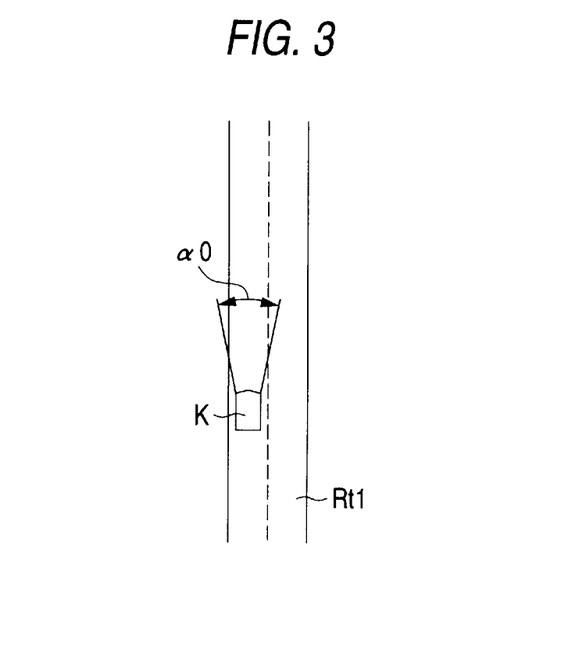
FIG. 3 is a schematic illustration showing the irradiation angle of a lighting device on a straight road.
Figure 4:
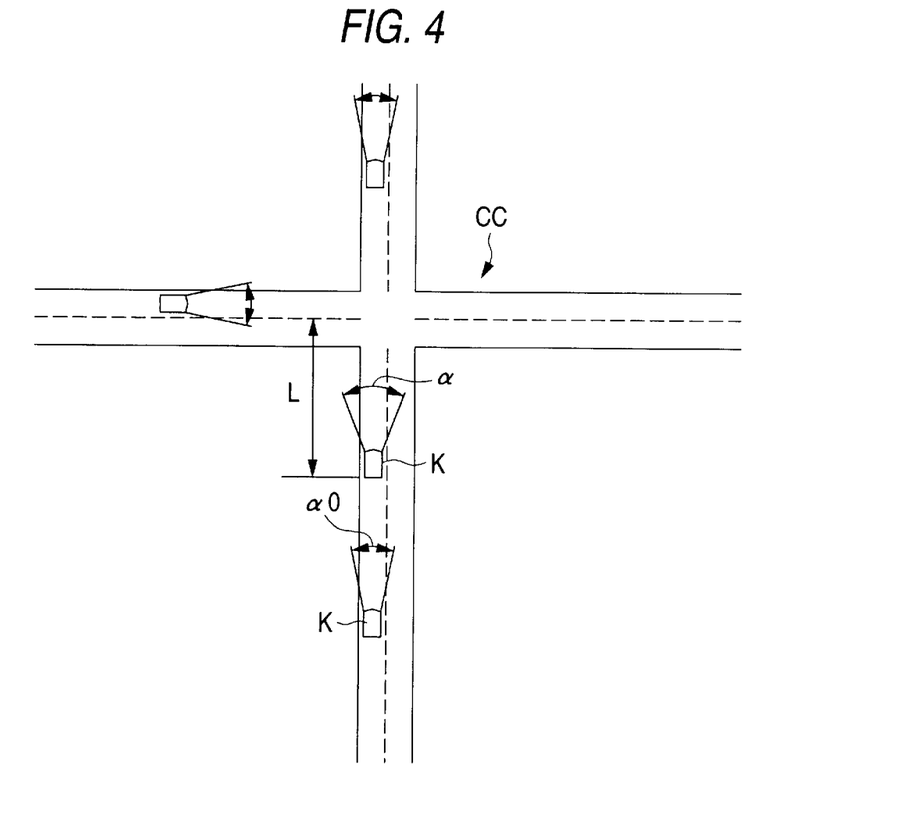
FIG. 4 is a schematic illustration showing the irradiating angle of a lighting device at an intersection.
Figure 5:
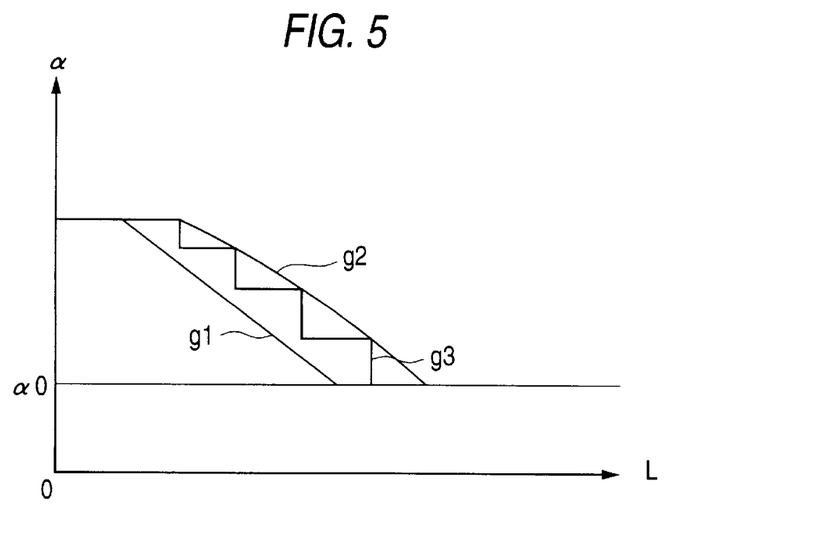
FIG. 5 is a schematic illustration showing a relation between the distance from the intersection to the vehicle and the irradiating angle.

First, concerning the above item (a), operation is performed as follows. Irradiation control is changed according to whether or not there is a branch (intersection) ahead on a road. In the case where there is a branch on the road, the irradiating range is changed in accordance with the distance from the branch to the vehicle and the time obtained when the distance is divided by the vehicle speed. For example, the irradiating range is changed as follows. As shown in FIG. 3, "α0" is a horizontal irradiating angle with respect to the irradiating range of the lighting device when vehicle K is running on road Rt1 having no branch ahead in a predetermined distance. In the above case, when vehicle K comes to a point distant from the intersection CC by distance L as shown in FIG. 4, the horizontal irradiating angle α is changed so that α>α0, or alternatively the horizontal irradiating angle α is increased when the vehicle comes close to intersection CC, wherein the irradiating angle α is determined as a function α(L, v) of distance L and vehicle speed v. That is, as shown in FIG. 5 in which the horizontal axis represents a distance L and the vertical axis represents an irradiating angle α, as shown by straight line g1 containing a straight line inclined by a predetermined angle and also as shown by curve g2 containing a curved portion, a can be continuously changed with respect to L. Alternatively, as shown by a stepwise line g3, the irradiating angle α can be changed stepwise with respect to distance L.

The irradiating angle α can be changed before the vehicle K passes through intersection CC, while vehicle K is passing through intersection CC, and after vehicle K has passed through intersection CC. For example, after vehicle K has passed through intersection CC, the irradiating angle α may be controlled in such a manner that the irradiating angle α is gradually reduced in accordance with the distance from intersection CC to vehicle K. The above control may be changed according to the type of intersection CC.

Next, in item (b), according to the operation signal of the driver of the vehicle and also according to the detecting information of the vehicle running condition, the driver's intention is reflected on the irradiation control. That is, according to the detecting signals of the vehicle posture such as a direction indicating signal and detecting signals of a steering direction, steering angle, vehicle speed and vehicle acceleration, the way of irradiation control can be changed. For example, when the vehicle speed is not lower than a predetermined value, it is predicted that the vehicle is running straight, so that the irradiating direction is set ahead, and in order to enhance the visibility, the irradiating range is reduced. Alternatively, when the vehicle speed is reduced or when the vehicle acceleration in the case of speed reduction is higher than a predetermined range, it is predicted that the track of the vehicle is changed or the vehicle is stopped, and the irradiating angle can be changed in accordance with the speed and/or acceleration.

It is possible to combine item (a) with item (b). For example, when the vehicle is running on a road having a branch ahead and a direction indicating signal is given by the driver, the irradiating range is changed in accordance with a distance from the vehicle to the branch. When the vehicle is running on a road having no branch ahead and a direction indicating signal is given by the driver, it is possible to somewhat extend the irradiating range in a direction indicated by the direction indicating signal by the above method described in item (B-2). This can be applied to a case in which the detection of the steering direction and steering angle is combined with the existence of a road branch. Control of the irradiating range is different between the following two cases. One is a case in which the vehicle is running on a road having a branch ahead and a change in the steering angle is larger than a predetermined range, and the other is a case in which the vehicle is running on a road having no branch ahead and a change in the steering angle is larger than a predetermined range. In the latter case, it is possible to control the irradiation in such a manner that the irradiating range is somewhat extended to the steering side.

When the detection of the vehicle speed and acceleration is combined with the existence of a road branch, the following control may be conducted. For example, even when the vehicle speed is not lower than a predetermined value, in the case of a road having no branch ahead, the irradiating range is made constant. Also, when the vehicle speed is suddenly reduced in the case of a road having no branch ahead, it is predicted that the vehicle will change its track or the vehicle will stop, so that the entire irradiating range is extended.

The reason why the irradiation control is changed in accordance with the result of discrimination of the existence of a branch on the road in the above control, is based on a concept that it is necessary to ensure a wider visual field when a vehicle passes through a branch. Accordingly, it is preferable to extend the irradiating range in the case of a road having a branch to be larger than the irradiating range in the case of a road having no branch.

When deceleration of the vehicle is detected by the vehicle speed detecting means 7 and the vehicle acceleration detecting means, it can be predicted that there is a high possibility of changing the track. Accordingly, from the viewpoint of ensuring the visual field of the driver in the case of changing the track, it is preferable that the irradiating range be extended larger than the irradiating range in the case of running at a constant speed.

The irradiating range is described above, however, it should be noted that the above control can be applied to a case in which a portion of irradiating light is directed to a specific direction.

The above item (b) is used to judge whether or not data about the road profile can be obtained. When the data concerned can not be obtained, it is impossible to control irradiation in accordance with the road profile. Therefore, the irradiating direction and range of the lighting device are controlled according to the information sent from the vehicle advancing direction predicting means 3.

The aforementioned control conducted by the irradiating control means 4 is conducted when the irradiation control means 4 receives a command signal from the indicating means 8 (shown in FIG. 1). For the indicating means 8, it is possible to use an exclusive manual switch, or alternatively it is possible to use an existing switch such as a lighting switch of the lighting device. In the case of a control device by which a lighting device is automatically turned on, for example, in the case of a device in which a light is turned on and a luminous intensity is controlled when the brightness in the circumstances is detected, the indicating means for automatically turning on the light corresponds to the indicating means 8.

FIGS. 6 to 12 are views showing an example in which the present invention is applied to a lighting device for automobile use.

FIGS. 6 to 11 are views for explaining the first example in which the communication between road and vehicle is used.

Figure 6:
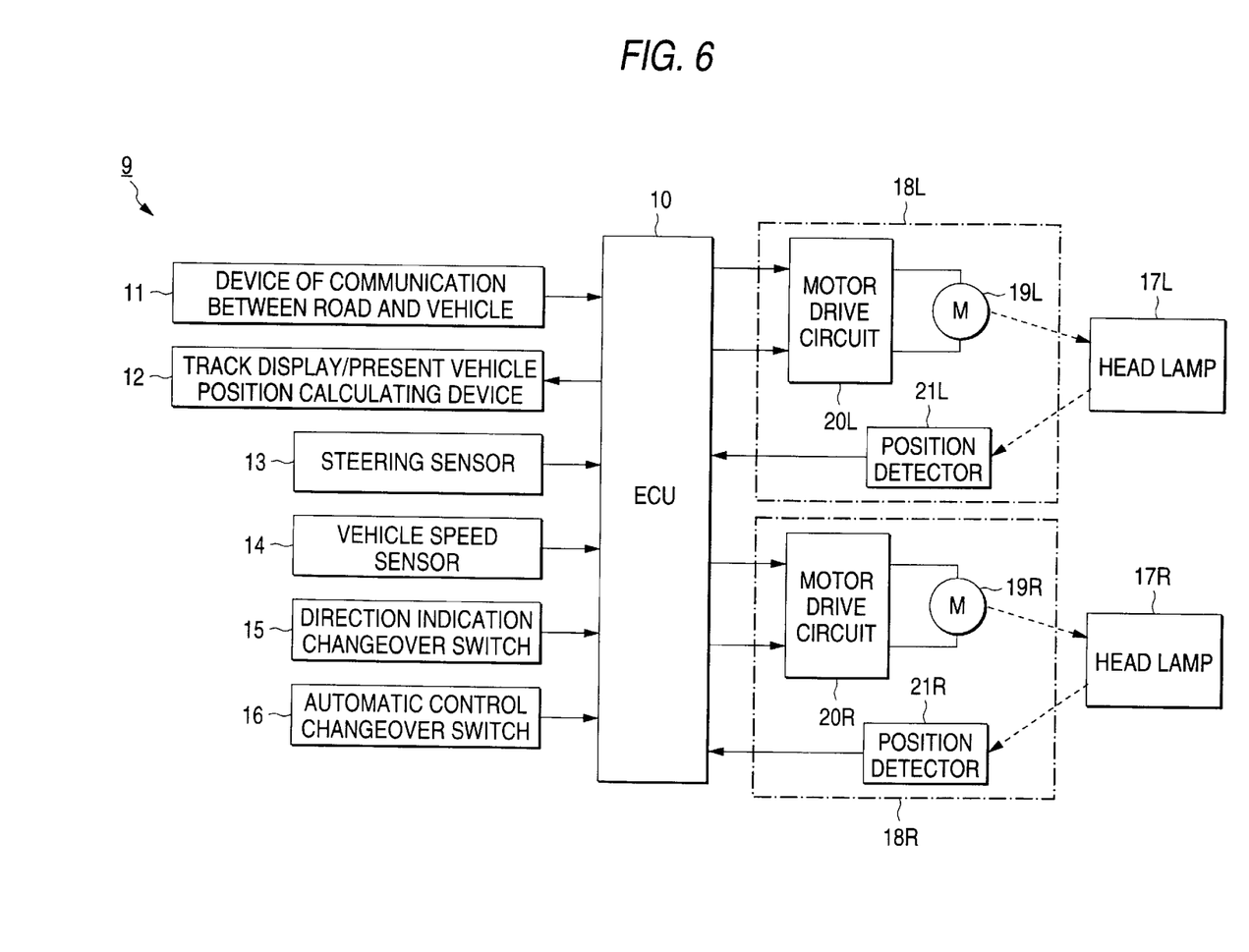
FIG. 6 is a view showing the first example of the present invention together with FIGS. 7 to 11, wherein this view is a block diagram showing the device structure.

FIG. 6 is a block diagram showing an arrangement of the device 9. ECU (electric control unit) 10 into which a computer is incorporated corresponds to the aforementioned irradiation control means 4. Signals are inputted into ECU (electric control unit) 10, which are sent from a communication device 11 conducting communication between a road and vehicle, track display/present vehicle position calculating device 12, steering sensor 13, vehicle speed sensor 14, direction indicating switch 15 and automatic control change-over switch 16. Signals outputted from ECU 10 are respectively sent to the drive sections 18L, 18R of the head lamps 17L, 17R respectively arranged on the right and left of the front portion of a vehicle. In this connection, when ECU 10 is accommodated in the head lamps 17L, 17R or alternatively attached to the outside of these head lamps, ECU 10 can be easily replaced. Of course, ECU 10 may be shared by another ECU arranged in the vehicle.

By the communication device 11 conducting communication between a road and vehicle, the road profile and road structure data can be provided via a beacon. The track display/present vehicle position calculating device 12 displays a track on which the vehicle is running at present and also displays a position at which the vehicle is located at present. Also, the track display/present vehicle position calculating device 12 corrects the present vehicle position when the vehicle comes close to a beacon, and calculates the present vehicle position between beacons. In this connection, both of them correspond to the road profile calculating means 2 described before.

The steering sensor 13 is arranged for the purpose of detecting a steering direction and angle when the steering wheel is operated. Concerning the vehicle speed sensor 14 and direction indicating switch 15, it is possible to use the sensor and switch which are arranged presently. In this connection, ECU 10 predicts the advancing direction of the vehicle by the information sent from the above sensor is and switch.

The automatic control change-over switch 16 corresponds to the aforementioned indicating means 8 described before. The automatic control change-over switch 16 is composed in such a manner that a switch to select; "Interlocking mode of communication between road and vehicle" or "Uninterlocking mode of communication between road and vehicle" is added to a three-step lamp switch having three steps of "off", "lighting of small lamps and tail lamps" and "lighting of all lamps". In this connection, "Interlocking mode of communication between road and vehicle" is a mode in which irradiation control of the head lamps 17L, 17R is conducted in accordance with a road profile by using the communication between road and vehicle, wherein this mode includes control in which the intention of a driver is respected. "Uninterlocking mode of communication between road and vehicle" is a mode in which irradiation control of the head lamps 17L, 17R is conducted in accordance with information (including a prediction of the vehicle advancing direction) except for information about the road profile, wherein this case occurs when a vehicle passes through a place in which beacons for the communication between road and vehicle are not arranged.

In the device 9, when a lamp switch (not shown) is set at a position except for turnoff, ECU 10 obtains signals from various sensors and conducts initial setting such as detection of the reference position of the lighting device in the drive sections 18L, 18R and also the detection of the reference position (zero point) of the steering sensor 13.

The drive section 18L(18R) includes: a motor 19L(19R) to drive the lighting device 17L(17R) or its composing member under the control of ECU 10; a motor drive circuit: 20L(20R); and a position detector 21L(21R) to detect the posture of the head lamp 17L(17R) or its composing member.

Figure 7:
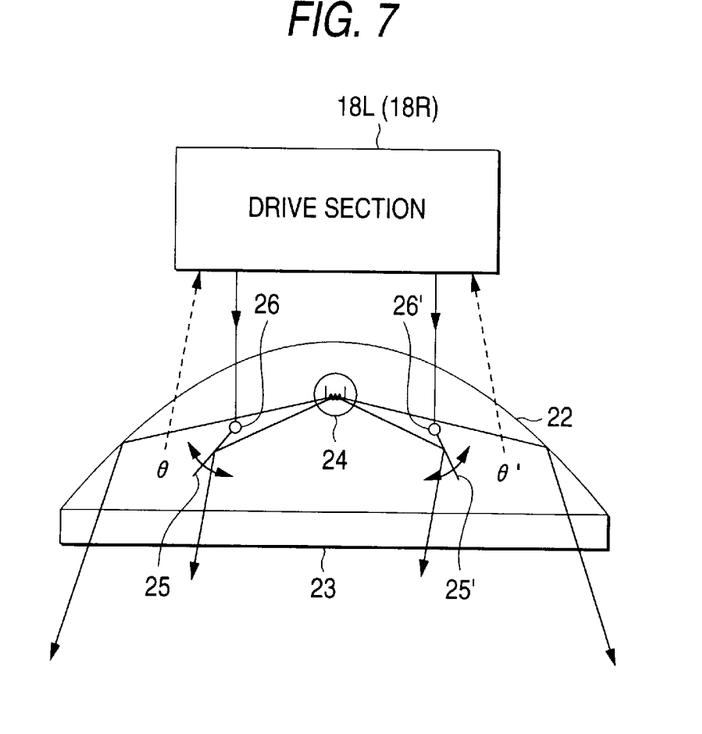
FIG. 7 is a schematic illustration showing the arrangement of a lighting device.
Figure 8:
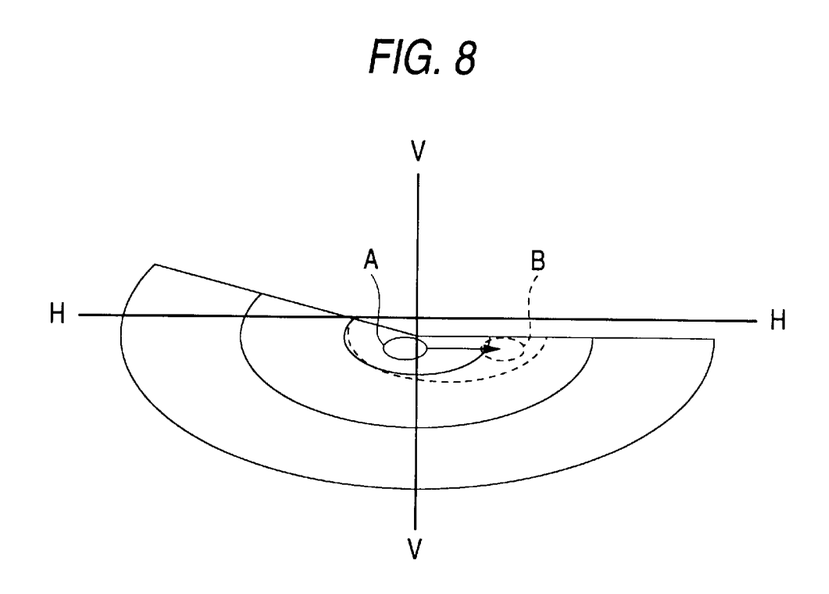
FIG. 8 is a schematic illustration showing an example of the change in a luminous intensity distribution in a light distribution pattern.

FIG. 7 is a schematic illustration showing an example of the structure of the head lamp. In the lighting device space formed between the stationary reflecting mirror 22 and the front lens 23, there are provided a light source 24 and a pair of movable reflecting mirrors 25, 25'. When the movable reflecting mirrors 25, 25' are rotated about the respective rotating axes 26, 26' by a link mechanism, rotating angles (θ, θ') of the movable reflecting mirrors 25, 25' are controlled, so that the partial direction control of irradiating light can be conducted. As shown by the arrow in FIG. 8 which is a schematic illustration of the light distribution pattern of a low beam, the center of luminous intensity is moved from section A to section B, so that the luminous intensity distribution can be changed to a curve shown by a broken line in the drawing. In FIG. 8, lines "H—H" and "V—V" are reference lines on a screen located in the front of the vehicle by a predetermined distance, and line "H—H" is a horizontal line, and line "V—V" is a vertical line. In this connection, a low beam is taken up as an example in the above case. Of course, control of irradiating direction and irradiating range may be also conducted on a main beam. Also, the entire irradiating range may be directed to a desired direction. For example, in the case of a projector type head lamp in which a shade member is arranged between the condenser lens and the reflecting mirror, there is provided a method in which members composing the optical system such as a reflecting mirror, light source and shading member are rotated about the principal point of the condenser lens on a horizontal surface including the optical axis.

Next, an example of control of ECU 10 will be explained when it is executed in the interlocking mode of communication between road and vehicle. As shown in the flow chart of FIG. 9, first, in step S1, the present position of a vehicle is calculated by the track display/present vehicle position calculating device 12. That is, when the vehicle passes through a position close to a beacon, the positional information of the vehicle is corrected, or when the vehicle runs between beacons, the present position of the vehicle is calculated in accordance with the vehicle speed and running time. In this connection, when information is sent from a beacon by means of optical communication, it is possible to obtain information in a small range round the beacon. Accordingly, when information sent from the beacon includes information about a position at which the beacon is installed, it is possible to find the present position of the vehicle with high accuracy, the error of which is several meters, when the vehicle passes through the beacon.

Figure 9:
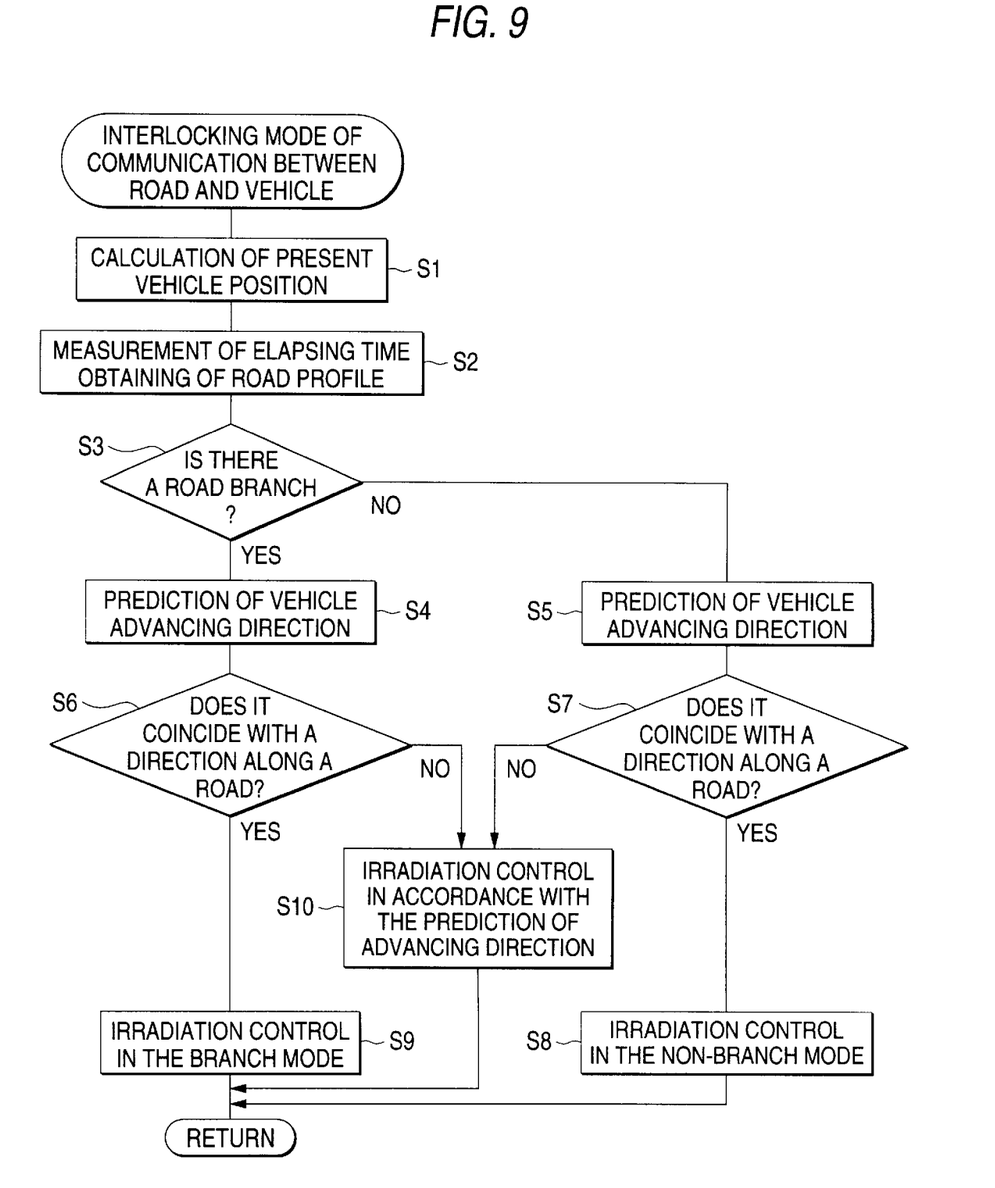
FIG. 9 is a flow chart showing a procedure in the interlocking mode of communication between road and vehicle.

Next, in step S2, a period of time that has passed from when the vehicle passed through a position close to the beacon is measured, and information about the road profile obtained from the beacon is analyzed. In this case, the above information includes a radius of curvature and a center of curvature in the case of a curved road. Also, the above information includes a distance of the section and a position of an intersection in the case of a straight road. In this connection, step S2 may be replaced with step S1.

In step S3, it is judged whether or not there is a branch ahead in the front of a road on which the vehicle is running at present. When there is a branch ahead on the road, the program proceeds to step S4. When there is no branch ahead on the road, the program proceeds to step S5.

In step S4, according to the direction indicating signal, steering angle detection signal detected by the steering sensor 13, vehicle speed detecting signal detected by the vehicle speed sensor 14 and acceleration detecting signal which is a rate of change with respect to time of the vehicle speed detecting signal, the advancing direction of the vehicle, which is changed when the vehicle comes close to the branch, is predicted in real time, and then the program proceeds to step S6. In this connection, when the advancing direction of the vehicle is predicted, it is possible to use a method of algebra of logic (Boolean algebra) in which a table of truth value is made. On the table of truth value, examples of the input values are three values (right, left, nothing) with respect to the direction indicating signal, values representing at least two ranges (large and small of steering angle, and large, intermediate and small of steering angle) with respect to the steering angle detecting signal, values representing at least two ranges (high and low of vehicle speed, and high, intermediate and low of vehicle speed) with respect to the vehicle speed detection signal, and values representing at least two ranges (acceleration, constant speed and deceleration) with respect to the acceleration detecting signal. On the table of truth value, examples of the output values are values representing the result of judgment (going straight, turning to left, turning to right and stop). Except for the above method, it is possible use a method in which a fuzzy relation is set on the relation between input and output so that a vague expression such as "substantially straight" or "substantially turning to left" can be given.

An example of the prediction logic is shown on the following table 1.

TABLE 1

| Direction indicating signal | Change in steering angle | Vehicle speed | State of acceleration and deceleration | Predicted value |
| --- | --- | --- | --- | --- |
| o | o | H | o | T |
| o | o | H | x | T |
| o | o | L | o | T |
| o | o | L | x | T |
| o | x | H | o | T |
| o | x | H | x | S |
| o | x | L | o | T |
| o | x | L | x | S |
| x | o | H | o | T |
| x | o | H | x | T |
| x | o | L | o | T |
| x | o | L | x | T |
| x | x | H | o | S |
| x | x | H | x | S |
| x | x | L | o | H |
| x | x | L | x | S |

Direction indicating signal = o (Right or left), x (No)
Change in steering angle = o (Large), x (Small)
Vehicle speed = H (High speed), L (Low speed)
State of acceleration and deceleration = o (Deceleration), x (Acceleration or constant speed)
Predicted value = S (Going straight), T(Turn to the right or left) H(Stop)

The above table is only a simplified example. In general, the actual circumstances are variously changed according to the traffic (quantity and density of traffic), the structure of a road, the form of a road (highway or local way, number of lanes, and width of vehicle), and traffic regulations of each country (speed limit, driving on the right or driving on the left).

For example, when a vehicle runs on a road having a branch ahead in the advancing direction, an arrival time and arrival distance in which the vehicle arrives at the branch are added to the basic information to predict the vehicle advancing direction. In accordance with the thus obtained information, the predicting logic can be changed as shown on the following table 2.

TABLE 2

| Arrival time to branch | State of steering | Direction indicating signal | Vehicle speed · state of acceleration and deceleration | Predicted value |
|---|---|---|---|---|
| o | o | o | o | S |
| o | o | o | x | S |
| o | o | x | o | S |
| o | o | x | x | S |
| o | x | o | o | E |
| o | x | o | x | — |
| o | x | x | o | E |
| o | x | x | x | — |
| x | o | o | o | T |
| x | o | o | x | — |
| x | o | x | o | S |
| x | o | x | x | S |
| x | x | o | o | E |
| x | x | o | x | S |
| x | x | x | o | E |
| x | x | x | x | S |

Arrival time to branch = o (Not less than predetermined value), x (less than predetermined time)
State of steering = o (Appropriate), x (Inappropriate)
Direction indicating signal = o (Right or left), x (No)
Vehicle speed · state of acceleration and deceleration = o (Possible to run at branch), x (Impossible to run at branch)
Predicted value = S (Going straight), T (Turn to right or left) E (Deviation from predicted track) — (Unthinkable operation)

In this connection, on the above table 2, when the arrival time to the branch is added to the reference of judgment, the logic is prescribed in such a manner that the prediction value is made different by whether or not the arrival time is outside of a predetermined period of time. In this connection, the steering condition is appropriate when one of the following items (a) to (c) is satisfied:

(a) When a branch is located ahead on a road and there is a plenty of arrival time to the branch (i.e., time it takes, to arrive at the branch), a change in the steering angle is in an allowable range with respect to the operation of the vehicle to go straight or change a lane;

(b) When a branch is located ahead on a road and there is not a plenty of arrival time to the branch, a change in the steering angle is in an allowable range with respect to the operation of the vehicle to go straight or turn to a direction indicated by the direction indicator; and (c) When no branch is located ahead on a road, a change in the steering angle is in an allowable range with respect to the operation of the vehicle to go straight or change a lane.

The reason why the prediction logic is changed according to the arrival time or arrival distance to a branch is that the meaning of changing a track of a vehicle is different by a positional relation between the present vehicle position and the branch. That is, when a driver change a track at a branch on a road, usually, he gives a direction indicating signal at a position sufficiently before the branch, and at the same time, he reduces the vehicle speed so that the track of the vehicle can be changed at the branch. However, other than the change in the track, it is possible to consider a case in which the vehicle changes a lane before the branch, or the vehicle deviates from the road on which the vehicle is running at present, before it reaches the branch. Accordingly, when the advancing direction of the vehicle is predicted, it is necessary to judge in accordance with the arrival time and arrival distance of the vehicle to the branch. For example, when the driver sends a direction indicating signal at a position before the branch, on the assumption that the vehicle enters the branch at the speed and acceleration of the vehicle at that time, it is judged whether or not the track can be changed in the direction indicated by the direction indicating signal. In this connection, concerning the reference value to judge the arrival time and arrival distance of the vehicle to the branch, it is possible to set different values according to the form (highway, bypass and local way) of the road.

In step S5, the vehicle advancing direction is predicted in real time according to the direction indicating signal, steering angle detecting signal detected by the steering sensor 13, vehicle speed detecting signal detected by the vehicle speed sensor 14 and acceleration detecting signal which is a rate of change with respect to time of the vehicle speed. In this connection, in the prediction logic to predict the vehicle advancing direction conducted in step S5, it is mainly judged whether the vehicle runs along the road on which the vehicle is running at present or the vehicle deviates from the road on which the vehicle is running at present.

In step S6, it is judged whether or not the vehicle advancing direction substantially coincides with one of the plurality of selections of the direction at the branch obtained by the road profile information. When the vehicle advancing direction substantially coincides with one of the plurality of selections of the direction, the program proceeds to step S9. When it is predicted that the vehicle advances to a direction which is not included in the previous information about the road profile, the program proceeds to step S10.

In step S7, it is judged whether or not the vehicle advancing direction substantially coincides with a direction along the road on which the vehicle is running at present. When the vehicle advancing direction substantially coincides with a direction along the road, the program proceeds to step S8. When it is predicted that the vehicle advances to a direction which greatly deviates from the direction along the road on which the vehicle is running at present, the program proceeds to step S10.

In step S8, control is conducted on a mode in which a road has no branch. This mode will be referred to as "no branch mode" in this specification hereinafter. In this case, essentially, irradiation control of the head lamps 17L, 17R is conducted in accordance with the profile of the road on which the vehicle is running at present. However, when the circumstances are changed and it is predicted that the vehicle will deviates from the road, irradiation control of the head lamps 17L, 17R is conducted in accordance with the predicted vehicle advancing direction.

Figure 10:
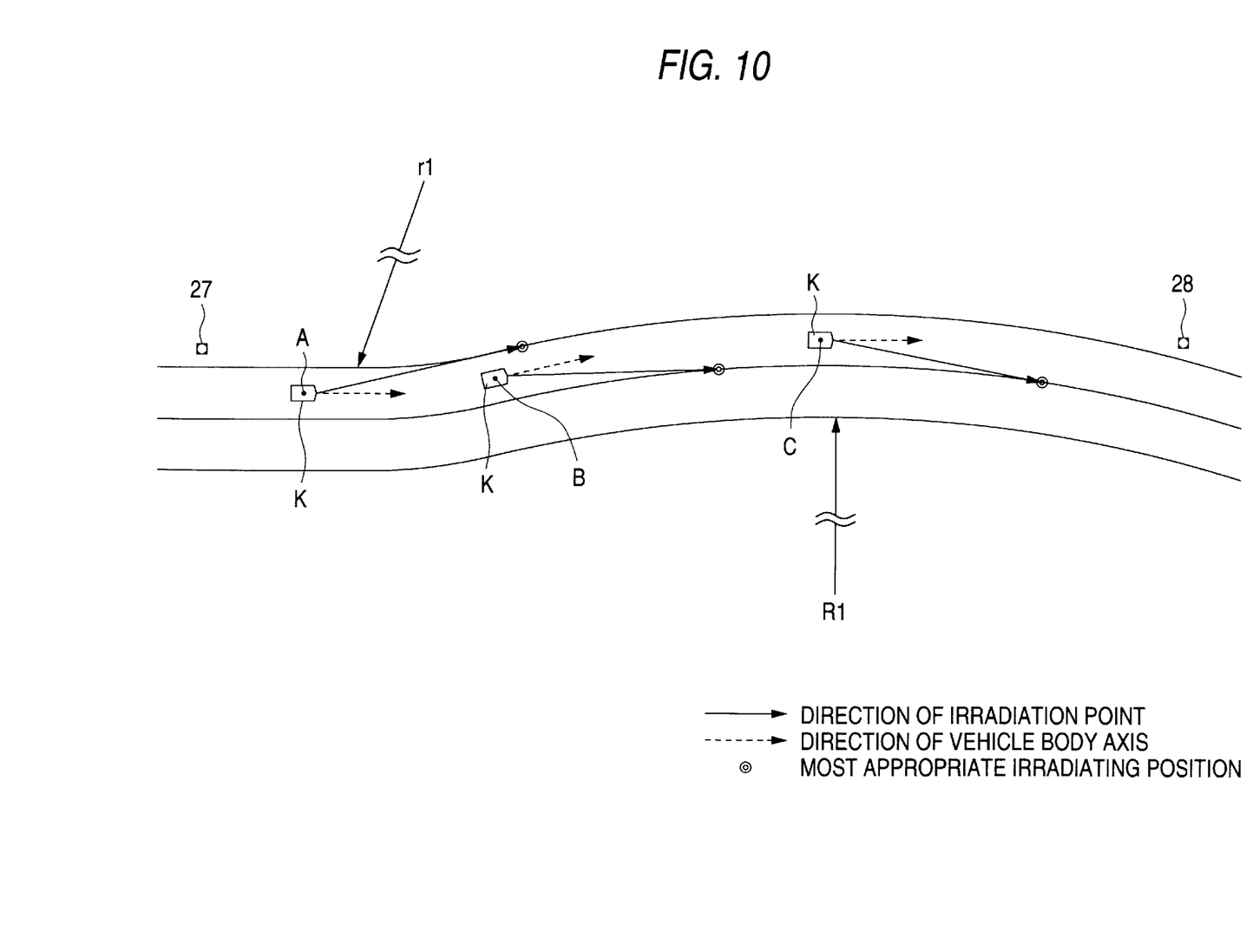
FIG. 10 is a schematic illustration for explaining irradiation control of a lighting device when a vehicle runs on a curved road.
Figure 11:
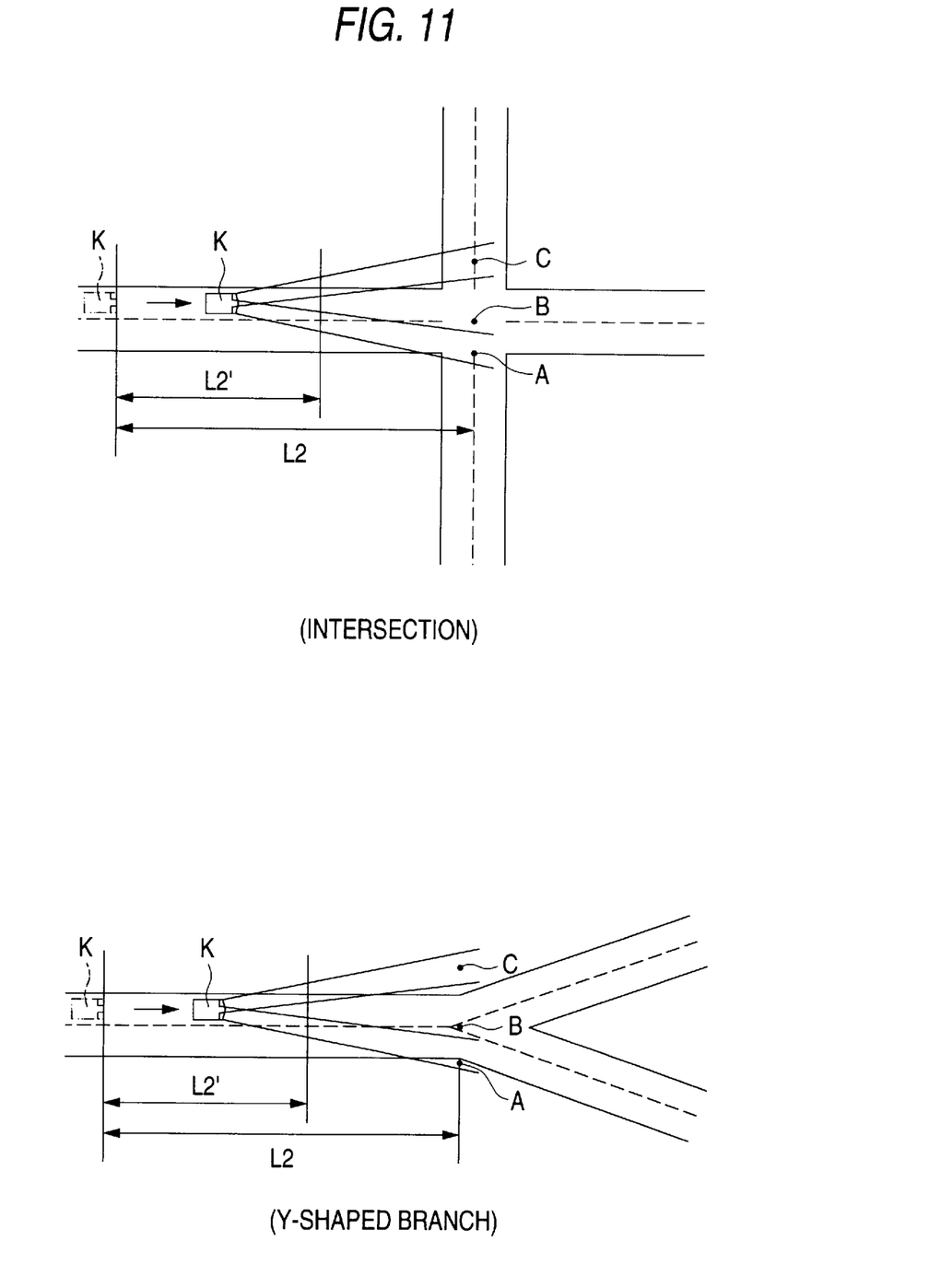
FIG. 11 is a schematic illustration of irradiation control conducted on a lighting device at a branch.

In FIG. 10, there is shown an example in which the beacon 27 is arranged at the entrance of one curved road and the beacon 28 is arranged at the exit of another curved road, and the radiuses of curvature are respectively r1 and R1, and vehicle K is running on these curved roads. In this example, irradiation control of the head lamp is controlled in the following manner. According to the road profile information, the elapsing time from the passage of the beacon 27 and the vehicle speed, the vehicle position between the beacon 27 and the next beacon 28 and the vehicle advancing direction are successively determined. In accordance with the vehicle speed, the most appropriate irradiating position at the front of the road is determined, and the irradiating direction of the head lamp is controlled. In this connection, in the drawing, an arrow of a broken line shows a direction of the vehicle body axis, a position indicated by a double circle is the most appropriate irradiating position at each position of the vehicle, and an arrow of a solid line directed from the front portion of the vehicle to the double circle is an irradiating direction of the head lamp.

For the purpose of safety of driving, a driver generally watches a point on a road which is distant from the vehicle of the driver by a predetermined period of time. This period of time is represented by "t1" second in this specification. This period of time t1 increases in accordance with an increase in the vehicle speed. A relation between the turning radius and the speed of the vehicle is close to a proportional relation. Therefore, when the vehicle runs on a curved road, the turning radius of which is small, the vehicle speed is decreased.

Accordingly, when the irradiating direction is controlled as described below, it is possible to control the irradiation light in accordance with the characteristic of the movement of the driver's line of sight and the safety of driving can be enhanced. The irradiating distance is set at a value obtained when the vehicle speed is multiplied by t1 second. As shown at point A in FIG. 10, when the vehicle turns to left, the left shoulder is irradiated. When the vehicle turns to right, the right shoulder is irradiated. When the vehicle is running at a point before the inflection point of the curved road, irradiation is conducted in a direction opposite to the direction of the shoulder irradiated till that time. In this way, the irradiating direction is controlled for enhancing the safety of driving.

In this connection, the steering angle detecting signal sent from the steering sensor 13 is used for judging whether or not the vehicle is running while it maintains the same lane. Also, the steering angle detecting signal is used for judging whether or not it is predicted that the driver is changing the lane when the driver operates the steering wheel by a steering angle larger than the steering angle necessary for the radius of curvature of the curved road. In the latter case, irradiation control is conducted in accordance with the vehicle advancing direction (the direction predicted by the steering angle) until the vehicle finishes changing the lane.

In step S9, control is conducted in a mode in which the road has a branch, which will be referred to as "Branch mode" in this specification hereinafter. In this case, the vehicle speed is represented by "v". It is assumed that the vehicle runs from the present position for a predetermined period of time "t2" at this speed "v". When the vehicle runs in the above condition, the running distance is represented by "L2" (=v·t2). Road profile data at a position located ahead by the distance "L2" is previously obtained, and irradiation control of the lighting device is conducted according to the thus obtained data. In this case, irradiation control is controlled according to the vehicle speed as follows:

(S9-$a$) Vehicle speed is not lower than a predetermined value; or (S9-$b$) Vehicle speed is low.

In the case of item (S9-$a$), when the vehicle speed is not reduced, it is predicted that the vehicle is running on the same road while it maintains the same running direction. Accordingly, it is judged in this case that the track is not changed at intersections including small intersections and Y-shaped branches located within the distance L2 except for a main intersection. However, when the acceleration in the case of reduction of vehicle speed exceeds a predetermined range or when a change in the steering angle is large, of course, prediction is made differently from the above prediction.

Concerning the controlling method of the irradiating direction, control is started when a distance from the intersection to the present vehicle position or a period of time obtained by dividing the distance by the vehicle speed is in a predetermined range. In order to clearly recognize the primary confirmation points, it is preferable to respectively control the irradiation light of each head lamp in the following manner. For example, the right head lamp of vehicle K shown in FIG. 11 irradiates primary confirmation points A, B in the right region located in the front of the vehicle, and the left head lamp of vehicle K shown in FIG. 11 irradiates primary confirmation points C, B in the left region located in the front of the vehicle. In this connection, the aforementioned control can be conducted in a predetermined section located within distance L2, for example, the aforementioned control can be conducted in the first period of time in t2 second, which will be represented by "t2$a$" (<t2). In this case, the irradiating condition is returned to the initial condition before the start of control after the vehicle has run by distance v·t2$a$ (=L2') from the control starting point.

Next, in the case of item (S9-$b$), irradiation control is conducted under the condition that there is a possibility of changing the track with respect to all intersections and Y-shaped branches, which are located on the road in distance L2 and neglected in step (S9-$a$), except for the primary intersections. The control conducted in step (S9-$b$) is essentially the same as the control conducted in the primary intersections described in step (S9-$a$). When the direction indicator is not operated while the vehicle stops at an intersection, the irradiating range of the head lamp may be entirely extended to the right and left.

The value of time t2 may be maintained constant. Alternatively, it may be changed in accordance with the vehicle speed or the type of the road branch.

Step S10 is a case in which there is a high possibility that the vehicle deviates from a road predicted by the road profile. In this case, irradiation control of the head lamps 17L, 17R is conducted in accordance with the vehicle advancing direction, that is, the interlocking mode of communication between road and vehicle is released. Irradiation control of the head lamps 17L, 17R is conducted as follows. For example, it is judged whether the vehicle is running on a curved road or a straight road mainly according to the steering angle detection signal sent from the steering sensor 13. When the vehicle is running on a curved road, the turning radius of the vehicle is found in accordance with the steering angle detecting signal, and the irradiation distance is set in such a manner that a position located ahead on the road by a distance corresponding to several times of the speed per second can be irradiated with light.

In this connection, as shown on the above table 2, when the vehicle advancing direction is predicted according to the arrival time of the vehicle to the branch, there is provided a step to find the arrival time of the vehicle to the branch when there is a branch on a road after the existence of the road branch has been judged in step S3, and also there is provided a step in which the arrival time is compared with the reference value of judgment.

Next, the uninterlocking mode of communication between road and vehicle will be explained as follows. This uninterlocking mode of communication between road and vehicle includes: a case in which there are provided no beacons used for the communication between road and vehicle; a case in which the communication between road and vehicle is out of order so that the beacons can not be used; and a case in which the driver positively selects the uninterlocking mode of communication between road and vehicle. Irradiation control conducted in the above cases; is the same as irradiation control explained in step S10, or no irradiation control is conducted at all. Therefore, the detailed explanations are omitted here.

Figure 12:
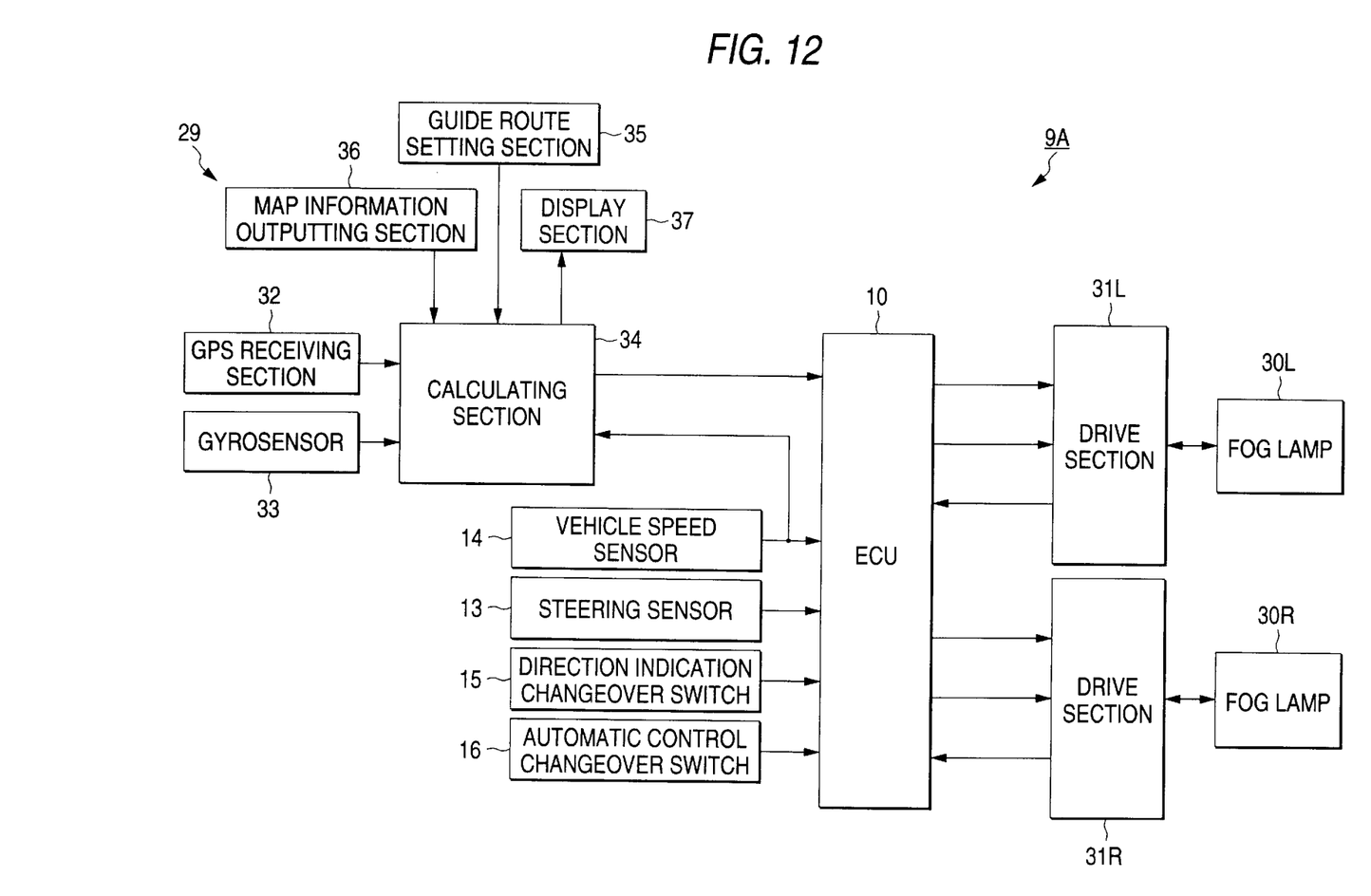
FIG. 12 is a circuit block diagram showing an arrangement of the device of the second example of the present invention.

FIG. 12 is a view showing the second example in which GPS satellite communication is utilized. Many portions of this second example are the same as those of the first example described before. Accordingly, like reference characters are used to indicate like parts in the first and the second examples, and the explanations are omitted here.

FIG. 12 is a block diagram showing an arrangement of the device 9A. ECU 10 is inputted with signals sent from GPS navigation device 29, steering sensor 13, vehicle speed sensor 14, direction indicating switch 15 and automatic control changeover switch 16. Output signals of ECU 10 are sent to the drive sections 31L, 31R of the fog lamps 30L, 30R respectively arranged at the right and left of the front portion of the vehicle.

GPS navigation device 29 corresponding to the road profile calculating means 2 includes: GPS receiving section 32, gyrosensor 33, calculating section 34, guide route setting section 35, map information output section 36, and display section 37. Movement of the vehicle is secured by the detection signals inputted into the calculating section 34 from the gyrosensor 33 and the vehicle speed sensor 14. A present position of the vehicle is calculated with accuracy according to the electric waves sent from GPS satellite received by GPS receiving section 32. The thus calculated vehicle position is displayed on the display section 37 together with the road data sent from the map information output section 36.

GPS navigation device 29 has the function of displaying information about the shortest distance course from the present vehicle position to the destination, the shortest time course, or the scheduled course including other input information such as a telephone number and address of the destination, instruction information and information stored by study. Also, GPS navigation device 29 has the function of guiding the driver along the course concerned. The necessary setting is conducted by the guide route setting section 35.

GPS navigation device 29 sends information about the road profile and the present vehicle position to ECU 10.

Processing of information conducted in ECU 10 is substantially the same as that of the first example described before. Different points from the first example are described as follows. The method of obtaining information by the communication between road and vehicle shown in the flow chart of FIG. 9 must be changed to the method of obtaining information by GPS navigation device 29. Basic information of prediction of the vehicle advancing direction in steps S4 and S5 includes a scheduled course of the vehicle which is set by the guide route setting section 35.

In the second example, the vehicle advancing direction is predicted in steps S4 and S5 when the direction indicating signal, steering angle signal sent from the steering sensor 13, vehicle speed detecting signal sent from the vehicle speed sensor 14 and acceleration detecting signal which is a rate of change of time of the vehicle speed detecting signal are referred to a scheduled vehicle advancing direction in the case where the vehicle advances along a course of route guidance. Accordingly, when the vehicle advances along a scheduled course, irradiation control of the lamp is conducted in accordance with the course concerned. When it is predicted that the vehicle deviates from the scheduled course, irradiation control is conducted in accordance with the vehicle advancing direction predicted by information such as a direction indicating signal, steering angle detecting signal and vehicle speed detecting signal except for information about the scheduled course.

As can be seen in the above explanations, according to the invention, while the vehicle advancing direction is predicted and it is judged whether or not the predicted direction is along the road profile, it can be determined at all times whether irradiation control of the lighting device is conducted in accordance with the road profile or irradiation control of the lighting device is conducted in accordance with the predicted vehicle advancing direction. Therefore, it is possible to prevent the occurrence of such a problem that the irradiating direction of the lighting device is changed in a direction at which the driver does not aim, or that the irradiating range of the lighting device is unreasonably reduced.

Further, when it is discriminated by the road profile calculating means that there is a branch ahead on a road, irradiation control of the lighting device can be appropriately selected according to a case in which the driver selects a track from a plurality of selections at an intersection and also according to a case in which the driver selects a track not included in the selections.

The vehicle advancing direction can be simply predicted according to the direction indicating signal, detection signal of the steering direction or information including a state of acceleration and deceleration of the vehicle.

The irradiating direction of the lighting device, irradiating range, starting time of control or control speed is changed according to the vehicle speed or vehicle acceleration. Due to the foregoing, irradiation control can be appropriately conducted in accordance with the running condition of the vehicle.

The irradiating range of the lighting device in the case of discrimination that there is a branch on the road is extended to be larger than the irradiating range of the lighting device in the case of discrimination that there is no branch on the road. Due to the foregoing, it is possible to ensure a visual field of the driver at the branch.

When the irradiating range of the lighting device in the case of detecting a decelerating condition of the vehicle is extended to be larger than the irradiating range of the lighting device in the case of acceleration or running at constant speed, it is possible to ensure a visual field of the driver before the vehicle changes its track or the vehicle stops.

When it is discriminated that there is a branch on a road, the irradiating range of the lighting device is changed in accordance with a distance from the branch to the present vehicle position or a period of time obtained when the distance concerned is divided by the vehicle speed. Due to the foregoing, irradiation control of the lighting device can be finely conducted in accordance with the branch, the vehicle and its running condition.

When the vehicle advancing direction is predicted referring to information showing a scheduled course for guiding a route to the destination, irradiation control can be conducted in accordance with the advancing direction in the case where the vehicle advances along the scheduled course.

When it is discriminated that there is a branch ahead on a road, the prediction logic of the vehicle advancing direction is changed in accordance with the arrival time or arrival distance of the vehicle to the branch. Accordingly, it is possible to appropriately predict the vehicle advancing direction according to a distance from the vehicle to the branch. Therefore, it is possible to judge whether the vehicle changes its track at the branch, the vehicle changes its lane before the branch or the vehicle deviates from the present track.

We claim:

1. A lighting apparatus for controlling irradiation of a vehicle lighting device, said lighting apparatus comprising:

an irradiation control means for controlling the irradiation of said lighting device in accordance with a road profile, operation of the vehicle and running condition of the vehicle;

a road profile calculating means for determining road-direction data representing a first predicted advancing direction of the vehicle, associated with an advancing direction of the vehicle in the case where the vehicle advances along a road on which the vehicle is running at present, in accordance with map information including the road profile and the present position information of the vehicle; and a vehicle advancing direction predicting means for predicting vehicle-direction data representing a second predicted advancing direction of the vehicle intended by a driver, on the basis of an operation signal given by the driver, wherein the operation signal given by the driver includes a direction indicating signal, and the vehicle advancing direction predicting means predicts vehicle-direction data based on at least the operation signal given by the driver, wherein the irradiation control means compares the road-direction data with the predicted-vehicle-direction data to determine a difference therebetween, and wherein the irradiation control means controls the lighting device in accordance with the road-direction data when said difference is in an allowable range, and controls the lighting device in accordance with the predicted-vehicle-direction data when the difference is outside of the allowable range.

2. The lighting apparatus according to claim 1, wherein the irradiation control means changes an irradiating direction of the lighting device, irradiating range, start time of control and control speed in accordance with at least one of a speed and acceleration of the vehicle detected by a vehicle speed detecting means.

3. The lighting apparatus for vehicle use according to claim 1, wherein when the road profile calculating means discriminates an intersection on a road, the irradiation control means extends an irradiating range of the lighting device as compared with an irradiating range of the lighting device in the case where there is no intersection on the road.

4. The lighting apparatus according to claim 1, wherein when at least one of a vehicle speed detecting means and a vehicle acceleration detecting means detects a deceleration state of the vehicle, the irradiation control means extends an irradiating range of the lighting, device as compared to the irradiation range for the case of acceleration or constant speed running.

5. The lighting apparatus according to claim 1, wherein the vehicle advancing direction predicting means predicts vehicle-direction data in accordance with information representing a scheduled course to the destination.

6. The lighting apparatus according to claim 1, wherein said vehicle advancing direction predicting means predicts vehicle-direction data representing a second predicted advancing direction of the vehicle intended by a driver on the basis of detection information of the vehicle running state.

7. The lighting apparatus according to claim 6, wherein said road-direction data includes profile data associated with each one of a plurality of vehicle advancing directions to be selected at an intersection, and is sent to the irradiation control means when the intersection is discriminated by the road profile calculating means, wherein the irradiation control means compares the profile data for each one of the vehicle advancing directions with the predicted-vehicle-direction data, and controls the lighting device in accordance with the profile data of the selected one of the vehicle advancing directions when a difference between the profile data of the selected one of the vehicle advancing directions and the predicted-vehicle-direction data is in an allowable range.

8. The lighting apparatus according to claim 6, wherein the vehicle advancing direction predicting means predicts vehicle-direction data in accordance with:

a direction signal given to a direction indicator;

a detection signal sent from a steering direction detecting means; and a signal representing an acceleration and deceleration state of the vehicle.

9. The lighting apparatus according to claim 6, wherein when the road profile calculating means discriminates an intersection on a road, the irradiation control means changes an irradiating range of the lighting device in accordance with a distance from the intersection to the present position of the vehicle or in accordance with a period of time obtained when the distance is divided by a vehicle speed.

10. The lighting apparatus according to claim 6, wherein when the road profile calculating means discriminates an intersection on a road, the vehicle advancing direction predicting means changes a prediction logic of the vehicle advancing direction in accordance with at least one of an arrival time in which the vehicle arrives at the intersection and an arrival distance.

* * * * *